May 3, 1949.   H. P. MURPHY   2,468,833
CONTAINER LIQUID LEVEL INDICATOR
Filed July 18, 1944
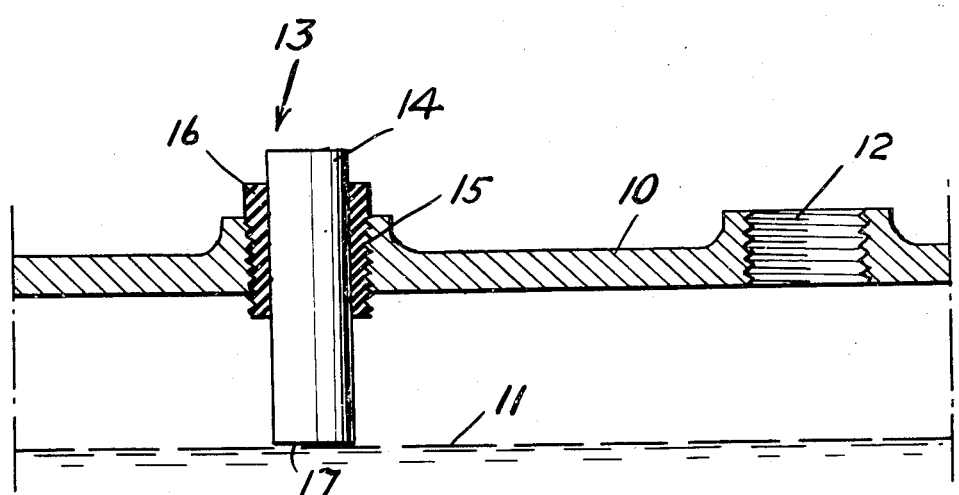
FIG. 1.
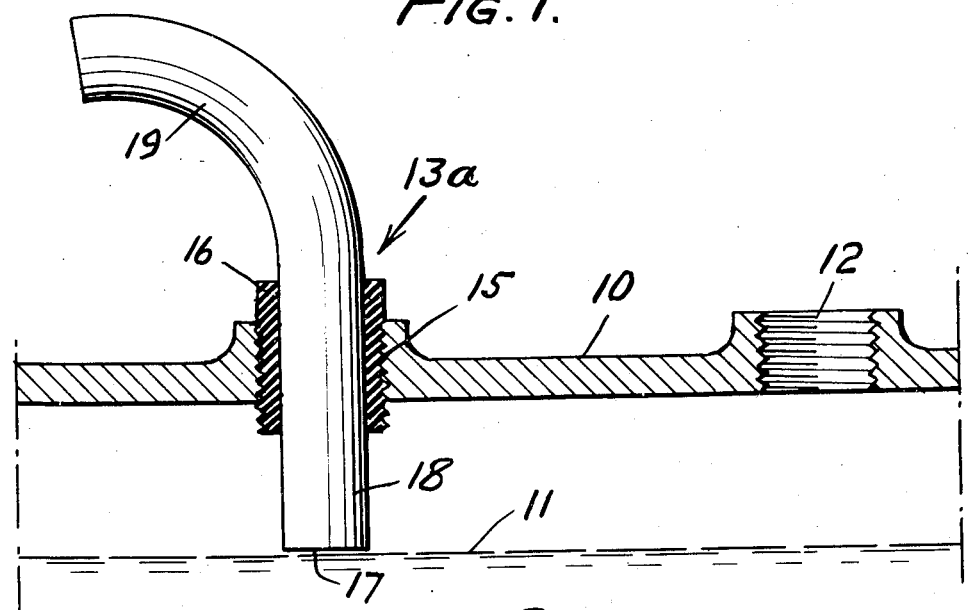
FIG. 2.
WITNESS:  FIG. 3. 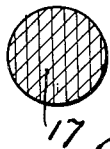
INVENTOR
Harold P. Murphy
BY Augustus B. Stoughton
ATTORNEY.

Patented May 3, 1949

2,468,833

UNITED STATES PATENT OFFICE 2,468,833

CONTAINER LIQUID LEVEL INDICATOR

Harold Purves Murphy, Ridley Park, Pa., assignor to The Electric Storage Battery Company, a corporation of New Jersey Application July 18, 1944, Serial No. 545,521

5 Claims. (Cl. 116—118)

This invention relates to devices for indicating from the outside of an opaque container the height of the liquid contained therein, and has for its object the provision of a device, simple in construction and inexpensive to manufacture, which will indicate positively when the liquid in an opaque container has risen to a predetermined height during a filling operation.

A further object of the invention is to provide such an indicating device which is rugged and without moving parts and not subject to deterioration or accidental injury in service.

Another object is the provision of such a device whose indication can be observed from a point at one side of the container and even below its top.

The invention will be more clearly understood by reference to the following description in connection with the accompanying drawing in which:

Figure 1 is a sectional elevation of a portion of the cover of a storage battery cell equipped with a level indicator embodying features of the invention.

Figure 2 is a similar view showing a modification; and

Figure 3 is an elevational view of the lower end of the device shown in Figs. 1 and 2.

Referring to Fig. 1, 10 is a portion of the cover of a storage battery cell containing electrolyte whose normal level is indicated at 11. The cover is provided with the usual filling opening 12 for the introduction of liquid and with the level indicator of the invention illustrated generally at 13. This indicator comprises a cylindrical rod 14 of transparent material such as glass or a synthetic resin such as methyl methacrylate or polystyrene. This rod passes through a threaded opening 15 in the cover where it is secured by an externally threaded sleeve 16 attached to the rod 14 by cement or other suitable means. The sleeve 16 is preferably of opaque material such as hard rubber.

The lower surface 17 of the rod 14 is roughened, frosted or scarified as by etching or grinding and is substantially horizontal and located at the desired maximum level 11 of the electrolyte.

When the liquid level is below the lower surface 17 of the rod 14, light passing down axially through the rod will be reflected back so that an observer looking down from above will see a bright reflection. When the liquid level rises sufficiently to make contact with the surface 17, light passing down through the rod will no longer be reflected but will be transmitted through the surface 17, which will instantly become dark, indicating that the desired level has been attained. It is not necessary that the observer's eye be directly above the rod, since the sudden disappearance of illumination is distinctly visible from points above but at some distance from the axis of the rod.

On Fig. 2 is shown a modification in which the cylindrical rod is replaced by a transparent member 18 provided with a curved portion 19 above the cover.

For the curved rod 18, 19, a material of relatively high refractive index is employed and its curvature is such as to cause practically all the light transmitted in either direction to pass around the curve so that the change in illumination resulting from the contact of the liquid with the scarified surface 17 will be readily observed from a distance at one side of and even below the top of the cover. The methyl methacrylate resin known by the trade name "Lucite" is an example of such material, and for "Lucite" the radius of the outer surface of the curved portion 19 should be not less than about three times the diameter of the rod.

I claim:

1. A device for indicating the liquid level in a container having a cover and containing liquid comprising a rod of transparent material mounted in an opening in the cover, said rod having a rough horizontal surface at its lower end reflecting light from above when out of contact with the liquid and transmitting said light substantially without reflection when in contact with the liquid, said horizontal surface being substantially parallel with the surface of the liquid.

2. A device for indicating the liquid level in a container having a cover and containing liquid comprising a rod of transparent material having a relatively high refractive index and extending down to the desired liquid level and having at its lower end a rough horizontal surface reflecting light from above when out of contact with the liquid and transmitting said light substantially without reflection when in contact with the liquid, said horizontal surface being substantially parallel with the surface of the liquid, said rod curved above the cover substantially out of the vertical.

3. A device for indicating the electrolyte level in a storage battery comprising a rod of transparent material adapted to extend though an opening in the said container and to terminate at approximately the normal electrolyte level, a sleeve surrounding said rod and adapted to be sealed to the edges of said opening in said container, and a rough horizontal surface at the lower end of said rod adapted to reflect light when out of contact with the liquid and to transmit light substantially without reflection when in contact with the liquid, said horizontal surface being substantially parallel with the surface of the liquid, whereby when said roughened surface is covered by liquid the upper end of said rod darkens noticeably to indicate that the liquid level is at least as high in the container as the lower end of said rod.

4. In a container adapted to receive liquids, a device for indicating whether liquid in the container is above or below a predetermined level comprising a rod of transparent material extending into the container and having a portion visible externally of the container, the portion of the rod within the container terminating at said predetermined level with a surface that transmits light while submerged in liquid and reflects light while not submerged, said surface being substantially parallel to the plane normally assumed by the liquid, whereby submergence of the end of the rod is sharply defined.

5. In a container adapted to receive liquids, a device for indicating whether liquid in the container is above or below a predetemined level comprising a rod of methyl methacrylate resin extending into the container and having a portion visible externally of the container, the portion of the rod within the container terminating at said predetermined level with a surface that transmits light while submerged in liquid and reflects light while not submerged, said surface being substantially parallel to the plane normally assumed by the liquid, the portion of the rod external of the container being curved to provide visibility of the liquid level from positions at one side of the container.

HAROLD PURVES MURPHY.

REFERENCES CITED

The following references are of record in the file of this patent:

UNITED STATES PATENTS

| Number | Name | Date |
| --- | --- | --- |
| 1,542,183 | Steinberg | June 16, 1925 |
| 1,883,971 | Kryzanowsky | Oct. 25, 1932 |
| 2,290,278 | Failla | July 21, 1942 |